United States Patent [19]
Johnson

[11] Patent Number: 5,566,963
[45] Date of Patent: Oct. 22, 1996

[54] FLOATING PIN FIFTH WHEEL HITCH

[76] Inventor: Marvin F. Johnson, Rte. 3, Box 287, Thief River Falls, Minn. 56701

[21] Appl. No.: 507,654

[22] Filed: Jul. 25, 1995

Related U.S. Application Data

[63] Continuation of Ser. No. 288,320, Aug. 10, 1994, abandoned.

[51] Int. Cl.⁶ ........................................ B60D 1/00
[52] U.S. Cl. ........................ 280/405.1; 280/433; 280/439
[58] Field of Search ........................... 280/405.1, 406.1, 280/407, 415.1, 417.1, 418.1, 433, 434, 438.1, 439, 441.2, 490.1, 483

[56] References Cited

U.S. PATENT DOCUMENTS

| | | | |
|---|---|---|---|
| 3,006,660 | 10/1961 | Merz | 280/405.1 |
| 3,035,855 | 5/1962 | Harris | 280/439 |
| 3,363,914 | 1/1968 | Neel, Jr. | 280/439 |
| 3,796,444 | 3/1974 | Hixon | 280/483 |
| 4,411,444 | 10/1983 | Holloway | 280/407.1 |
| 4,826,199 | 3/1988 | Chambers | 280/434 |
| 5,044,651 | 8/1990 | Weikel | 280/407 |

FOREIGN PATENT DOCUMENTS 1062552  7/1959  Germany ........................ 280/439

Primary Examiner—Brian L. Johnson
Assistant Examiner—Victor E. Johnson
Attorney, Agent, or Firm—Curtis V. Harr

[57] ABSTRACT

A floating pin fifth wheel hitch is disclosed. This hitch uses separate points to bear the vertical and horizontal forces created by the towed vehicle. By allowing the pivot point to float and thus bear only the horizontal forces of the trailer it can be placed rearward of the rear axle of the towing vehicle without adverse affects to the handling characteristics of the truck and trailer combination. The hitch is further supplied with a vertical force or weight bearing slide that can be placed above or in front of the rear axle of the towing vehicle. By splitting the forces created by the trailer and letting them be born by the towing truck a hitch is created that allows for a short turning radius while still shortening the overall length of the truck and trailer combination and keeping the weight of the trailer in a position that does not effect the handling or ride characteristics of the truck.

10 Claims, 8 Drawing Sheets

FIG 12A
PRIOR ART
FIG 12B
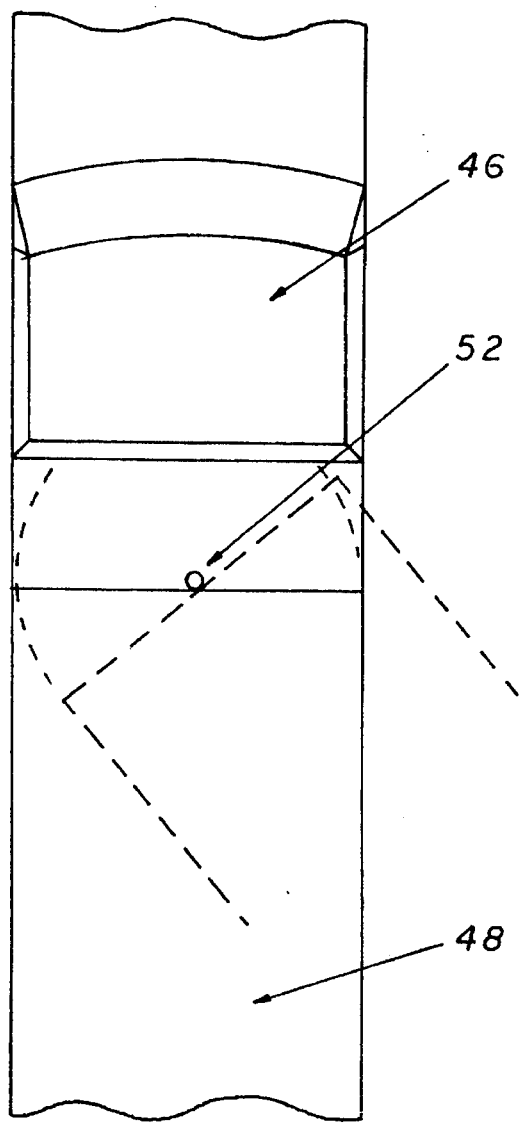
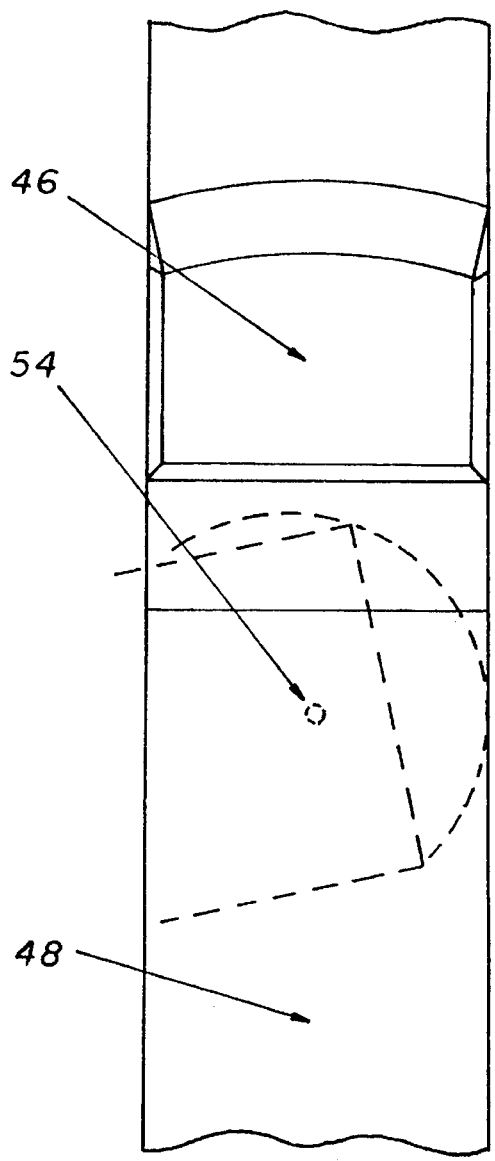

FLOATING PIN FIFTH WHEEL HITCH

This application is a continuation of application Ser. No. 08/288,320, filed Aug. 10, 1994, now abandoned.

BACKGROUND OF THE INVENTION

This invention relates generally to a hitch and more particularly to a hitch of the type which is adapted to be mounted in the back of a pickup truck and is suited to connect with the kingpin of a fifth wheel trailer. The standard fifth wheel hitch has a main crossbar mounted between supports in the bed of a pickup truck. This cross bar is made with a rearward opening throat for receiving the kingpin on the gooseneck of a fifth wheel trailer. The cross bar is further supplied with a latching mechanism for engaging the kingpin. In this typical configuration the kingpin transfers the weight of the trailer vertically into the pickup bed. The king pin also bears the horizontal turning and pulling forces of the trailer.

The safety and handling characteristics of a truck and trailer combination is determined by three main factors. The first factor is the placement of the hitch point in the bed of the pickup. Ideally the vertical force or weight of the trailer should be born by the pickup directly above or in front of the rear axle of the pickup. If to much weight is placed on the rear of the pickup it will cause the front end to ride high. The front end riding high can cause several problem such as poor steering control, instability and improper headlight aiming as the front of the truck moves up and down relative to the road from the weight placed on the rear end.

The second factor determining ride and handling characteristics of a truck and trailer combination is the overall length of the rig. The shorter the length the greater the driver safety and ease of maneuverability. Shortening the length has the added advantage of also increasing the maneuverability of the truck and trailer combination.

The third factor effecting the handling and safety of a truck and trailer combination is the distance from the front of the trailer to the cab of the truck. Fifth wheel trailers, especially the Recreational Vehicle type trailers, are commonly designed with an overhang section made to ride above the bed of a pickup truck. This has the effect of increasing the overall interior room while minimizing the length of the truck and trailer combination. The overhang can create serious problems when making sharp turns. If the front of the trailer is to close to the rear of the cab of the pickup the two can collide when making turns. The converse of this is that the closer the trailer is to the cab the more stabile the combination will be when travelling down the road and the less likely it will be to begin swaying. Thus, the closer the front of the Recreational vehicle to the rear of the pickup cab the more careful a driver must be when making turns. Especially sharp turns when maneuvering into a tight spot such as a campground camping spot or in the case of a horse trailer a farmyard.

From these three factors it can be seen that it is important to keep the weight of the trailer forward in the front of the rear axle in the pickup bed. It is also important to keep the over all length of the truck and trailer combination to a minimum and to further minimize the distance between the truck and trailer to create a stabile combination for highway speeds. It is still further desirable to have a rig that has a sharp turning radius without fear of causing damage to the truck cab or trailer. This problem has been approached through complicated and expensive weight transfer mechanism designed to transfer the weight from the hitch point to the front of the truck box. It has also been addressed by making a hitch that is moveable having a position that is forward for road stability and rearward for tight turning and maneuvering in close situations.

These problems have all been made worse with the popularity of extended cab pickups and short box pickups. As the length of the box decreases it becomes increasingly difficult to optimize the above factor in relationship to each other.

For the foregoing reason there is a need for a inexpensive fifth wheel hitch that can place the weight in front of the rear axle of the truck, decrease the overall length of the entire truck and trailer combination, and keep the cab of the truck close to the front of the fifth wheel trailer. Thus, allowing for tight turns in close quarters with out fear of damage to either vehicle.

SUMMARY OF THE INVENTION

The objects of this invention of providing an inexpensive fifth wheel hitch that can place the weight in front of the rear axle of the truck, decrease the overall length of the entire truck and trailer combination yet still allowing for a tight turning radius. These ends are accomplished by providing a floating point hitch which transfers the vertical force or weight of the trailer forward of the hitch point that floats vertically while bearing the horizontal turning and pulling forces of the trailer.

The portion of the hitch mounted in the truck consists of two supports that can be bolted into the bed of the truck, two cross member support arms mounted on top of supports and a cross member mounted laterally to the cross member support arms. The supports can be mounted in the bed of the truck at varying widths to allow for the cross members of varying lengths. The cross member support arms are pivotally mounted on the front edge to each support. The rear edge of the cross member support arms are held in the proper position for hitch attachment by springs in compression. The use of the springs does not effect the range of movement vertically after the trailer is attached to the truck. The cross member is allowed to move vertically on the compression spring component, limited only by the length of the bolt used in the compression spring component, yet it is unmovable in the horizontal plane.

The cross member is provided with a rearward opening throat to engage the kingpin of the fifth wheel trailer. The throat of the cross member is further provided with a latching mechanism for engaging the kingpin; many such latching mechanisms are commercially available.

Mounted in the truck bed is also a semi-circular weight bearing slide. This slide is mounted in front of the hitch point and bears the entire weight of the trailer.

Ideally the gooseneck of the trailer is provided with a slider pad in front of the kingpin. This pad is positioned to rest on the semi-circular slide. By designing the hitch point so that it can move vertically, the slide will bear the entire vertical force or weight of the trailer. A roller can also be substituted for the pad, however, a pad is preferred as the static and kinetic friction between the pad and the slide acts as a sway control in high winds and when travelling at highway speeds.

By positioning the weight bearing slide in front of the hitch point the weight can be placed in front of the rear axle yet the pivot point of the trailer relative to the truck can remain further back in the pickup box.

By moving the pivot point back in the pickup bed the radius of the circle defined by the pivot point to the front corner of the fifth wheel trailer is made larger. The larger this radius the flatter the arc that the trailer corners turn through this allows the front of the trailer to be positioned closer to the rear of the pickup cab with out fear of damage in tight turns.

Another embodiment of the floating point hitch utilizes the same idea but has the cross member mounted solidly having a trailer ball mounted to the cross member. Mounted to the gooseneck is a trailer ball receptacle that is slidable in the vertical plane through the use of a slot and pin. This method also uses the same slide pad and semi-circular slide.

DESCRIPTION OF THE DRAWINGS

FIG. 12 is a top view showing a comparison of the turning performance of a standard fifth wheel hitch verses the floating point fifth wheel hitch allowing for the pivot point to be moved rearward, more noticeably the turning limitations of the standard design is shown on the left side and the full turning capability of the present invention on the right side of the diagram.

DESCRIPTION OF THE PREFERRED EMBODIMENT

Referring to the accompanying drawings a floating pin fifth wheel hitch as used in the towing of recreational vehicles and utility trailers embodies various features of the invention as shown. In the illustrated embodiment, the present invention comprises a floating pin fifth wheel hitch apparatus 15. It must be stated that the present invention is equally applicable to other applications which incorporate the towing of vehicles by a fifth wheel type hitch.

Figure 1:
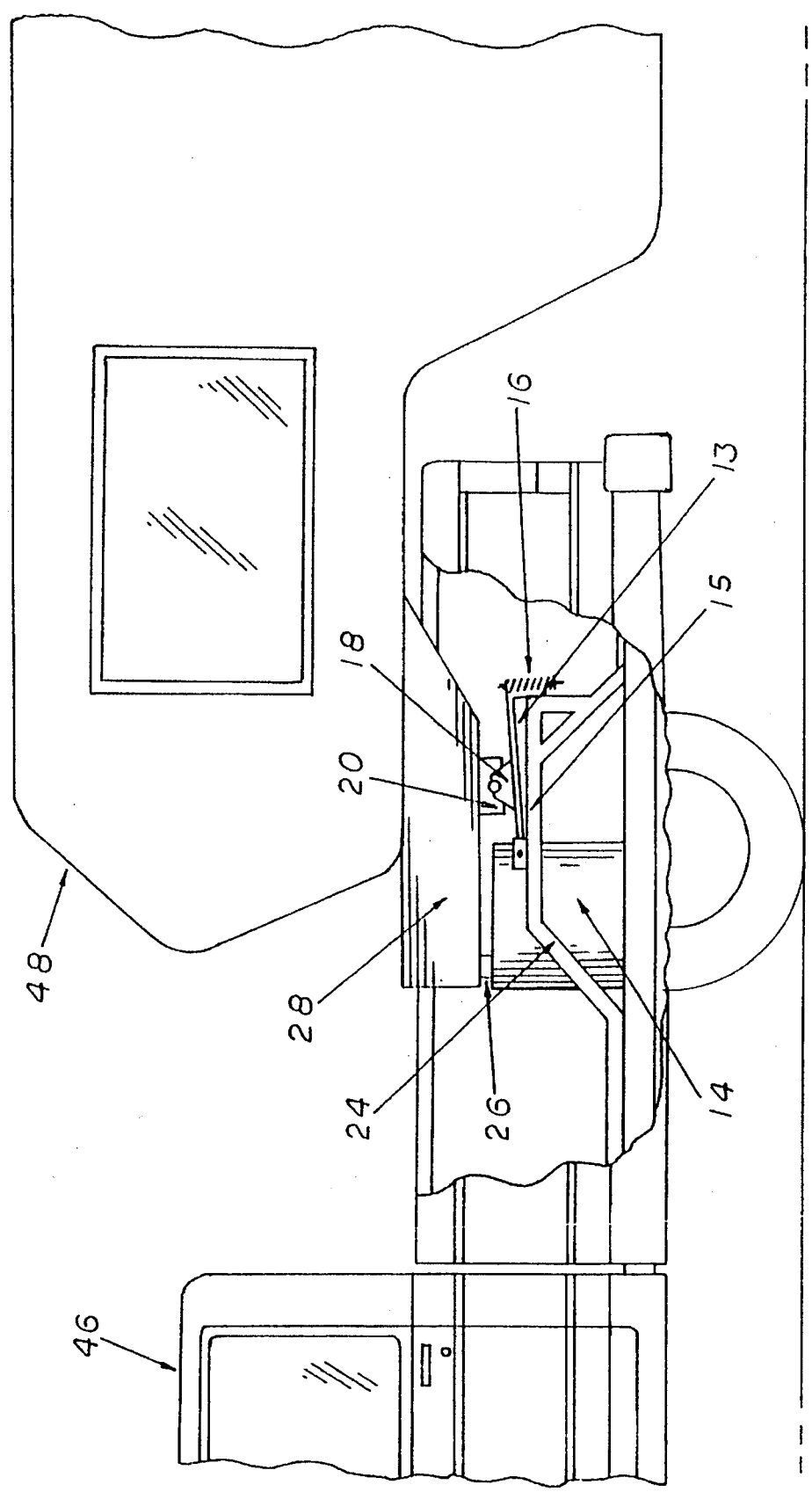
FIG. 1 is a side cut-away view of one embodiment of the present invention showing the construction of the hitch and the relation of its weight bearing component to the rear axle of the towing vehicle.
Figure 2:
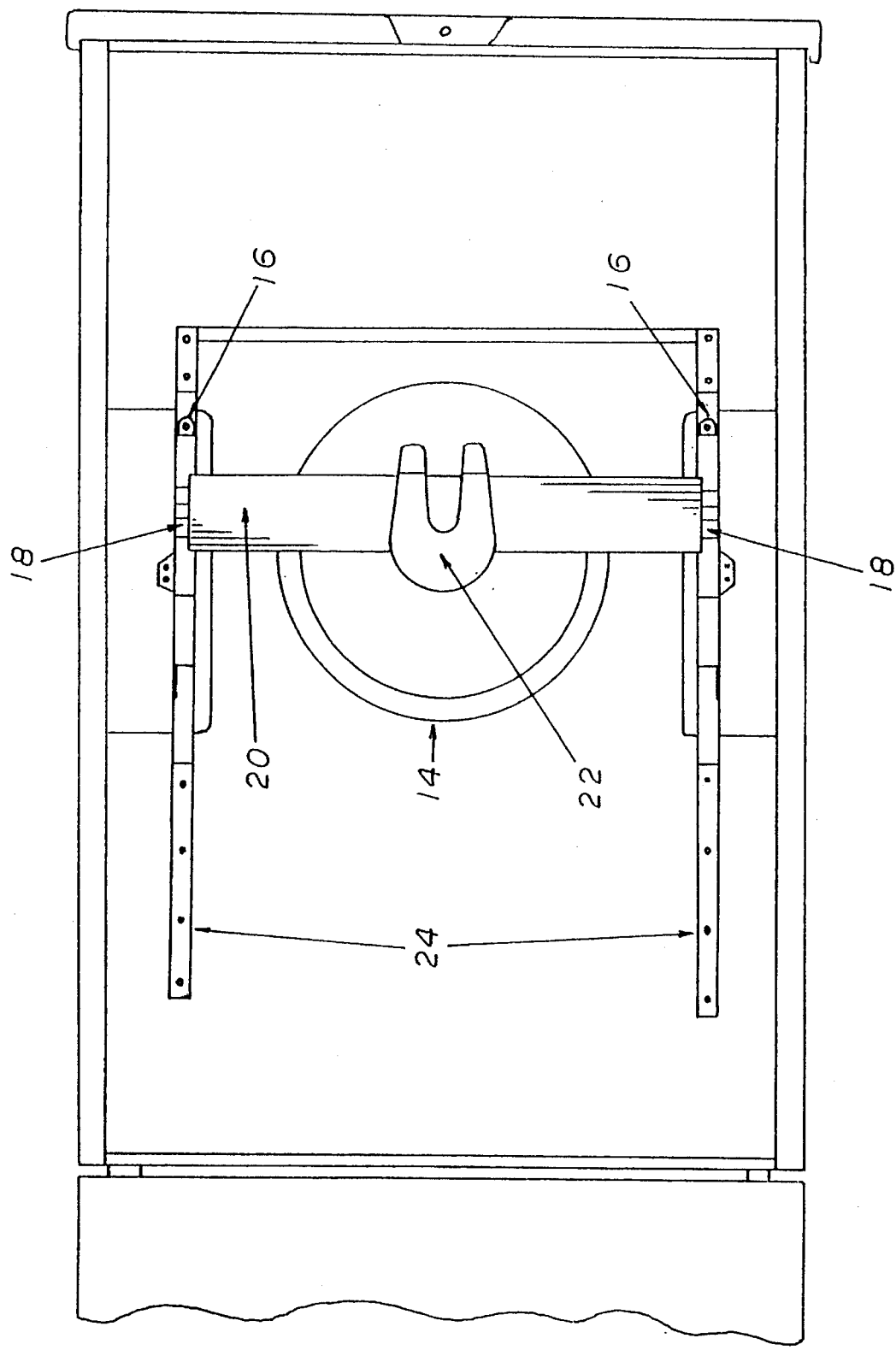
FIG. 2 is a top view of one embodiment of the present invention showing the components of the hitch their relationship to one another and their orientation within the towing vehicle.

As shown by the drawings in FIGS. 1 and 2 the floating pin fifth wheel hitch 15 comprises a gooseneck 28 that attaches to the towed vehicle 48. At the front bottom of the gooseneck 28 is a slider pad 26 that transfers the weight or vertical force of the towed vehicle 48, and slides along the top of the weight bearing slide 14, and the sliding surface 32 thereof, which is mounted to the bed of the towing vehicle 46.

Figure 4:
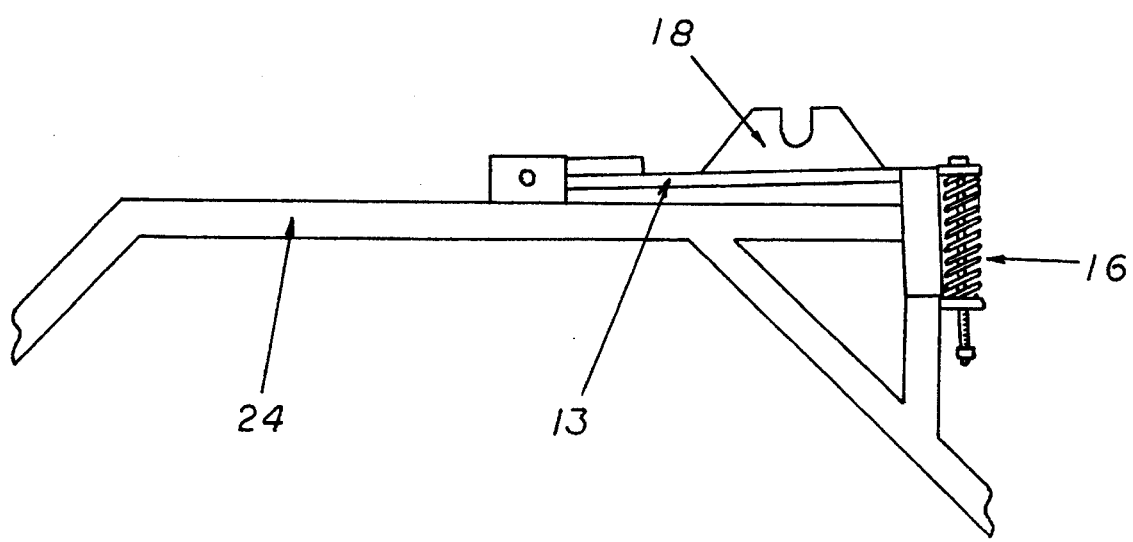
FIG. 4 is a side view of the cross member mount, the spring loaded cross member support arm and the hitch frame. This figure shows the orientation of these components to one another.
Figure 5:
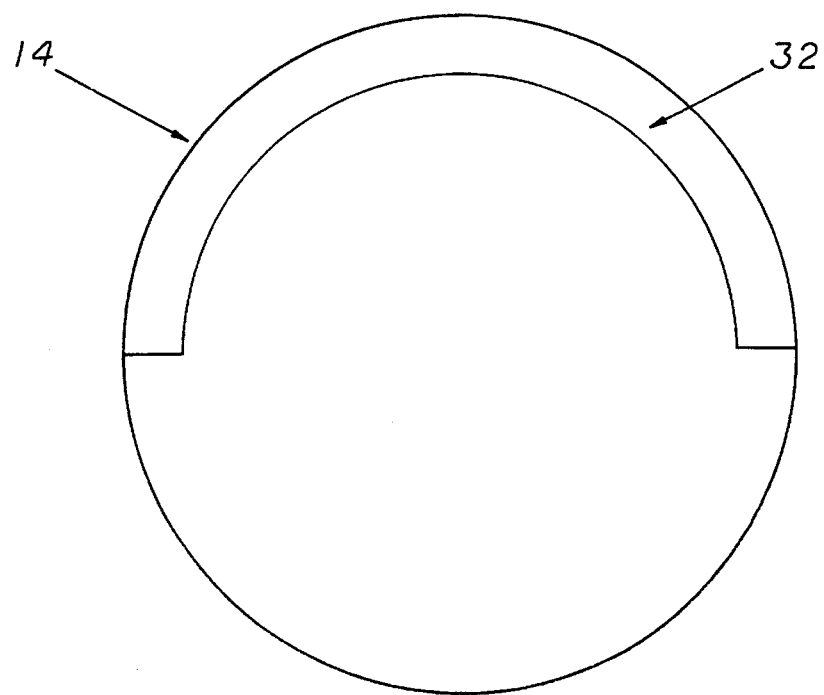
FIG. 5 is a top view of the weight bearing slide showing one embodiment of the construction of this component of the hitch which is suitable for use with recreational vehicle fifth wheel hitches.
Figure 6:
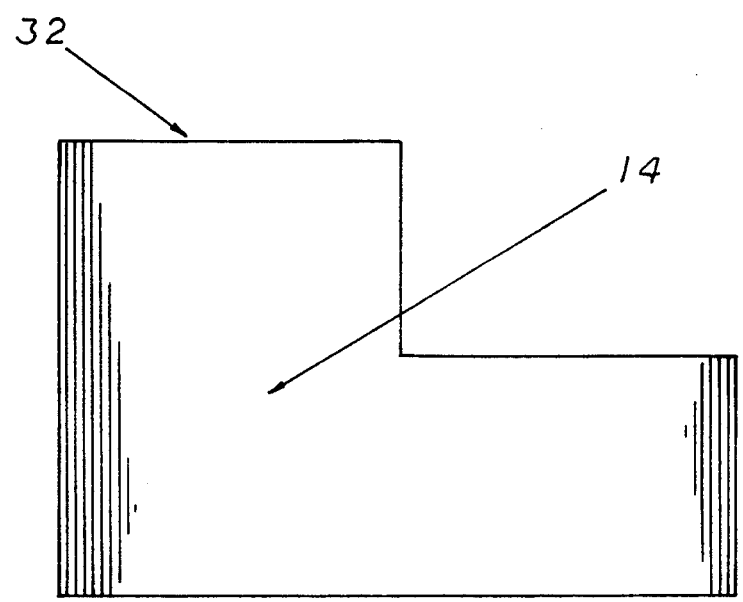
FIG. 6 is a side view of the weight bearing slide showing one embodiment of the construction of this component of the hitch which is suitable for use with recreational vehicle fifth wheel hitches.
Figure 7:
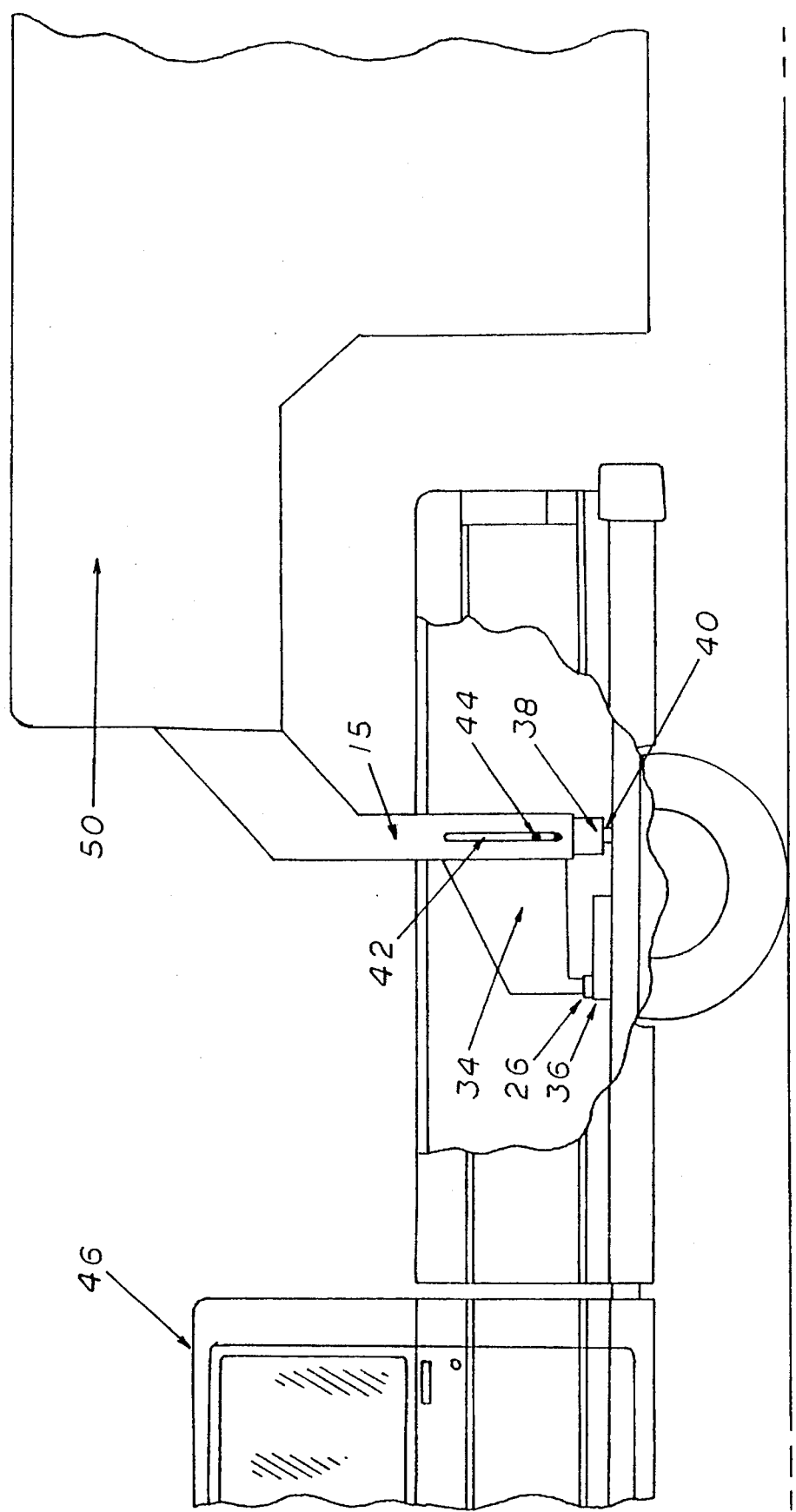
FIG. 7 is a side cut-away view of one embodiment of the present invention showing its application to utility trailers and the relation of the weight bearing components to the rear axle of the towing vehicle.
Figure 8:
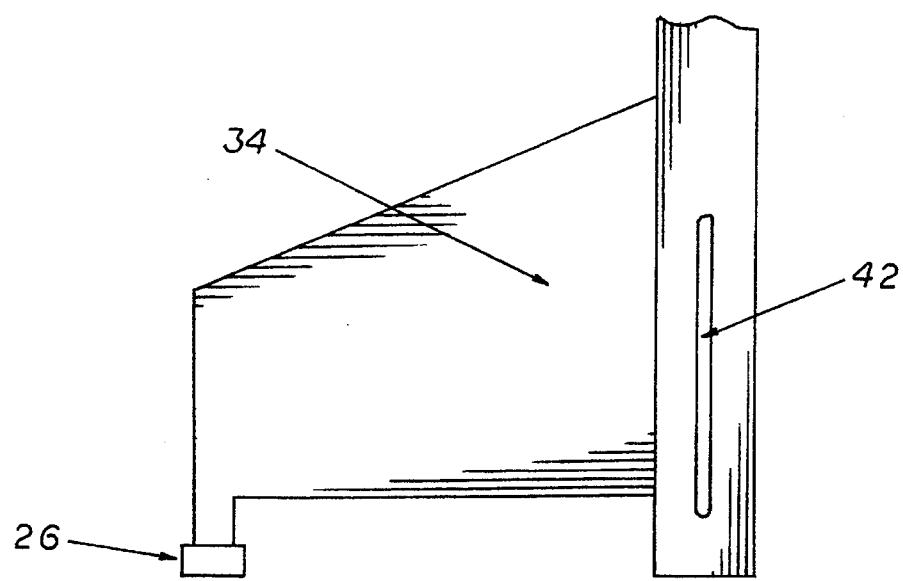
FIG. 8 is a side view of the vertical weight transferring components of the horse trailer hitch showing the major components as they relate to the present invention.
Figure 9:
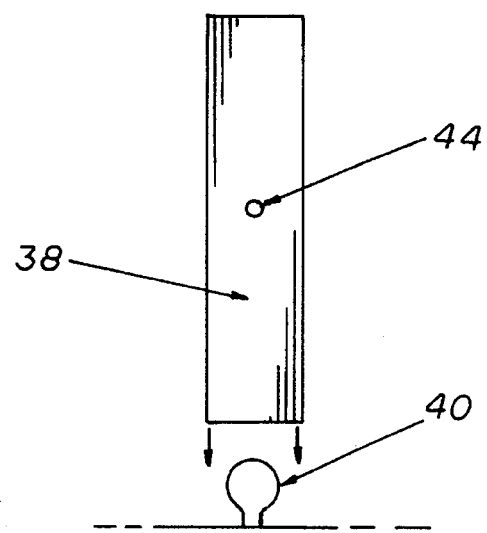
FIG. 9 is a side view of the sliding ball receptacle showing the relationship with the bed mounted trailer ball and its components that relate to the present invention.
Figure 10:
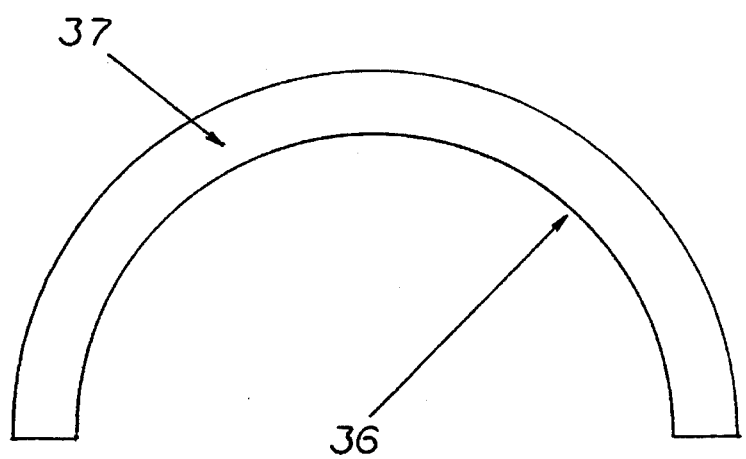
FIG. 10 is a top view of the weight bearing slide showing one embodiment of the construction of this component as used with a fifth wheel hitch and utility trailer such as a horse trailer.
Figure 11:
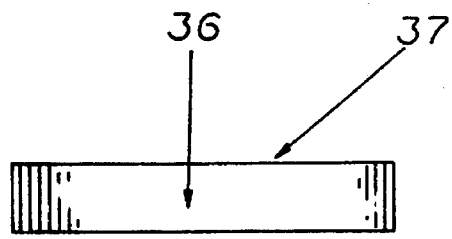
FIG. 11 is a side view of the weight bearing slide showing one embodiment of the construction of this component as used with a utility trailer such as a horse trailer.

As shown in FIGS. 1, 2 and 4 the floating pin fifth wheel hitch 15 is mounted to the bed of the towing vehicle 46 by the use of the support frame 24. The spring loaded cross member support arm 13 is attached to the top of the support frame 24 on its front side and to the compression spring component 16 on its rear side. The cross member mount 18 is attached to the top of the cross member support arm 13 and provides for the attachment of the cross member 20 to the frame 24.

The purpose of the floating cross member support arm 13 and the compression spring component 16 is to allow the cross member 20, and thereby the fifth wheel hitch throat 22, to move in a vertical manner as the vertical angle between the towing vehicle 46 and the towed vehicle 48 changes with varying road conditions.

Figure 3:
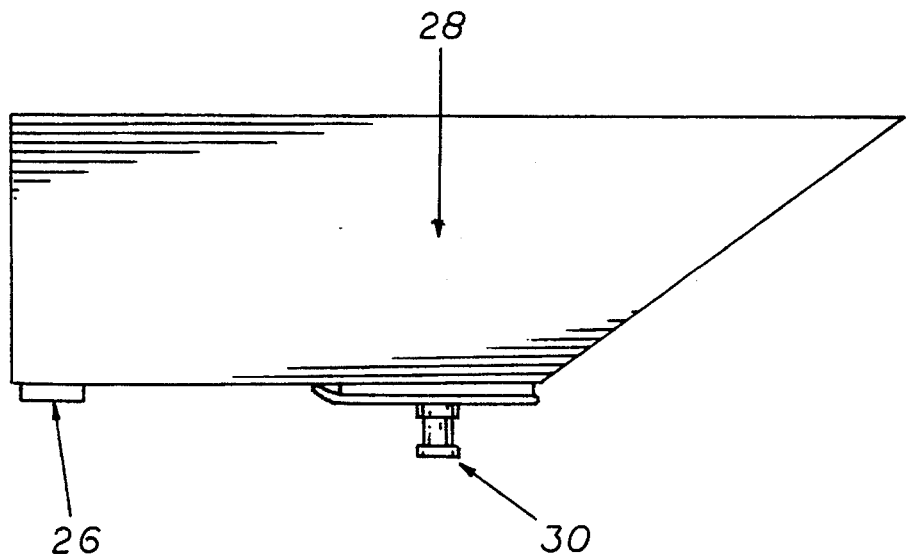
FIG. 3 is a side view of the gooseneck which attaches to the towing vehicle, showing the important components of the gooseneck as they relate to the present invention.

As shown in FIGS. 1 and 3, the gooseneck 28 attaches to the fifth wheel hitch throat 22 by use of the kingpin 30 which is in turn attached to the floating cross member 20. This allows the whole hitch assembly 15 to be horizontally stabilized while transferring the vertical weight to the weight bearing slide 14 mounted in front of the rear axle of the towing vehicle 46. As illustrated by the diagram in FIG. 12, another benefit of this design is that it allows the pivot point 54, as shown on the Floating Point Fifth Wheel Hitch, to be moved rearward of the weight bearing point. The weight bearing point of this new design corresponds to the line from 52 on the prior art. By moving the pivot point back from the conventional pivot point and weight bearing point 52 as shown on the prior art one may turn the vehicle 46 as much as 90 degrees to the angle of the towing vehicle 48. This is not possible with conventionally designed fifth wheel hitches when used in short box pickups Another embodiment of the present invention is shown by FIGS. 7,8,9,10 and 11. This embodiment is used in the towing of utility trailer such as horse trailers. This variation incorporates a slightly different weight bearing slide 36 that works the same as the weight bearing slide in the floating cross member hitch but allows for a lower height of the hitch relative to the bed of the towing vehicle 46.

The utility trailer hitch assembly 34 is comprised of a sliding ball receptacle 38 which fits inside of the main body of the hitch assembly 34 and attaches to a trailer ball 40 which is fastened to the bed of the towing vehicle 46. The sliding ball receptacle has a pin 44 which fits in and moves vertically within a slot 42 on the hitch assembly 34. This method of mounting horizontally stabilizes the entire towing assembly while allowing for the weight to be carried through the hitch assembly 34 by the weight bearing slide 36 mounted in front of the rear axle of the towing vehicle 46.

Although the present invention has been described in considerable detail with reference to certain preferred versions thereof, other versions are possible, such as the use of a roller instead of a slide pad or a version wherein the width of the whole support structure fits within the diameter of the weight bearing slide. Therefore, the spirit and scope of the appended claims should not be limited to description of the preferred versions contained herein.

What is claimed is:

1. A floating pin hitch adapted to interlock with a fifth wheel type trailer comprising:

a pickup type truck said truck having a front axle with a cab portion rearward of said front axle and a rear axle under a open low sided cargo bed with said cargo bed extending rearward of said cab;

a kingpin and a slide pad mounted to said trailer;

a pair of support frames fixedly mounted to the bed of said pickup type truck;

a pair of cross member support arms pivotally mounted to said support frames;

a cross member fixedly attached to said cross member support arms having a rearward opening throat for receiving said kingpin and a latch for engaging said kingpin, said throat being in a position above and rearward of said rear axle;

a means for pivotally mounting in a horizontal axis said cross member support arms to said support frames;

and a cylindrical weight bearing slide for receiving said slide pad fixedly mounted to the bed of the pickup forward of said rear axle and in front of said cross member.

2. The floating pin hitch in claim 1 wherein the cylindrical weight bearing slide comprises a semi-circular weight bearing wall having a flat upper surface.

3. The floating pin hitch in claim 2 wherein the means of pivotally mounting the cross member support arms comprises:

a pivotal hinge on a front bottom edge of said cross member support arms pivotally mounting said cross member support arms to said support frames;

and a pair of compression spring components attached to a bottom rear edge of said cross member support arms and mounted to said support frame.

4. The floating pin hitch in claim 3 wherein the kingpin and slide pad are attached to a gooseneck of the fifth wheel trailer; said kingpin being positioned to properly engage the rearward opening throat of said cross member and said slide pad being positioned to rest on top of said weight bearing slide.

5. The floating pin hitch in claim 4 wherein a roller is used in place of said pad.

6. A floating pin hitch adapted to be mounted in a bed of a pickup truck and interlock with a fifth wheel type trailer having a gooseneck said hitch comprising:

a slide pad mounted to a front portion of the gooseneck of said trailer;

said gooseneck having a vertical slot;

a vertically floating trailer ball receptacle;

said trailer ball receptacle mounted to said gooseneck with a slide pin moveable in said vertical slot;

a cross member having a fixedly mounted trailer ball;

a pair of supports adapted to be fixedly mounted to the bed of the pickup;

a means for fixedly mounting said cross member to said supports;

and a circular weight bearing slide for receiving said slide pad fixedly mounted to the bed of the pickup in front of said cross member.

7. The floating pin hitch in claim 6 wherein the weigh bearing slide comprises a semi-circular weight bearing wall having a flat upper surface.

8. The floating hitch in claim 7 wherein the vertical slidable ball receptacle is mounted to the gooseneck of the trailer with a pin and slide.

9. A floating pin hitch adapted to be mounted upon a pickup type vehicle having a front axle, a single rear axle, and a cargo bed and to interlock with a fifth wheel type trailer said hitch having a first contact point mounted on the bed of the pickup type truck which bears the horizontal pulling and turning forces of the trailer and floats vertically and a second contact point mounted in front of said first connection point which transfers the weight of the trailer to the bed of said pickup type truck, said hitch comprising:

said first contact point having a kingpin mounted to said trailer;

a pair of support frames fixedly mounted to the bed of said pickup type truck;

a pair of cross member support arms pivotally mounted to said support frames;

a cross member fixedly attached to said cross member support arms having a rearward opening throat for receiving said kingpin and a latch for engaging said kingpin, said throat being in a position above and rearward of said rear axle; and a means for pivotally mounting in a horizontal axis said cross member support arms to said support frames;

said second contact point having a flat slide pad mounted to said trailer; and a weight bearing slide for receiving said slide pad, said weight bearing slide being fixedly mounted to the bed of the pickup type truck in a position forward of said rear axle and said cross member.

10. The floating pin as in claim 1 wherein said cargo bed is flat.

* * * * *